United States Patent
Sato et al.

(10) Patent No.: US 7,627,199 B2
(45) Date of Patent: Dec. 1, 2009

(54) IMAGE SURVEILLANCE/RETRIEVAL SYSTEM

(75) Inventors: Kazuya Sato, Tokyo (JP); Tetsuji Haga, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 673 days.

(21) Appl. No.: 11/538,938

(22) Filed: Oct. 5, 2006

(65) Prior Publication Data
US 2007/0248244 A1  Oct. 25, 2007

(30) Foreign Application Priority Data
Apr. 6, 2006 (JP) ............... 2006-105466

(51) Int. Cl.
*G06K 9/60* (2006.01)
(52) U.S. Cl. .............. 382/305; 382/209; 382/278
(58) Field of Classification Search ............... 382/209, 382/219, 278, 305
See application file for complete search history.

(56) References Cited

U.S. PATENT DOCUMENTS

| | | | |
|---|---|---|---|
| 6,452,686 B1 * | 9/2002 | Svetkoff et al. | 356/602 |
| 6,584,211 B1 | 6/2003 | Amemiya et al. | |
| 6,750,974 B2 * | 6/2004 | Svetkoff et al. | 356/602 |
| 6,817,982 B2 * | 11/2004 | Fritz et al. | 600/443 |
| 7,199,882 B2 * | 4/2007 | Svetkoff et al. | 356/602 |

FOREIGN PATENT DOCUMENTS

| | | |
|---|---|---|
| EP | 0 805 405 | 11/1997 |
| EP | 0913799 | 7/2004 |
| JP | 6-022318 | 1/1994 |
| JP | 10-084525 | 3/1998 |
| JP | 10-150657 | 6/1998 |
| JP | 2004-064438 | 2/2005 |

OTHER PUBLICATIONS

Sato, et al., Human Search Technology for Surveillance Video, Mitsubishi Denki Giho, Aug. 2004.

* cited by examiner

*Primary Examiner*—Yosef Kassa
(74) *Attorney, Agent, or Firm*—Leydig, Voit & Mayer, Ltd.

(57) ABSTRACT

An object processing unit divides each image frame of received image data into block areas, extracts an object from each image frame, and extracts, as metadata, the features of this object for each block area. A real-time detection processing unit compares the metadata extracted for each block area with a received real-time detection query, and detects an object which satisfies the real-time detection query. A post-retrieval processing unit compares the metadata for each block area stored in a metadata storage unit with a received post-retrieval query, and retrieves an object which satisfies the post-retrieval query.

7 Claims, 10 Drawing Sheets

FIG.3

(a) Division of Screen into m×n Rectangular Block Areas

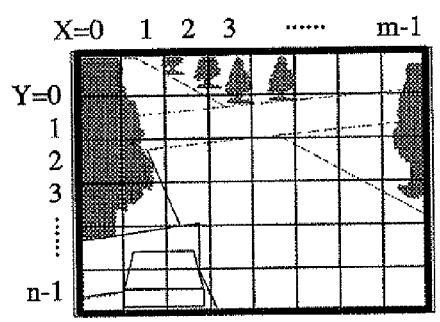

(b) Information Array Corresponding to m×n Block Areas

|  | X=0 | X=1 | ... | X=m-1 |
|---|---|---|---|---|
| Y=0 | Traveling Direction<br>Traveled Distance<br>Travel Time | Traveling Direction<br>Traveled Distance<br>Travel Time |  | Traveling Direction<br>Traveled Distance<br>Travel Time |
| Y=0 | Traveling Direction<br>Traveled Distance<br>Travel Time | Traveling Direction<br>Traveled Distance<br>Travel Time |  | Traveling Direction<br>Traveled Distance<br>Travel Time |
| ... |  |  |  |  |
| Y=n-1 |  |  |  |  |

FIG.4
(a) Extraction of Object
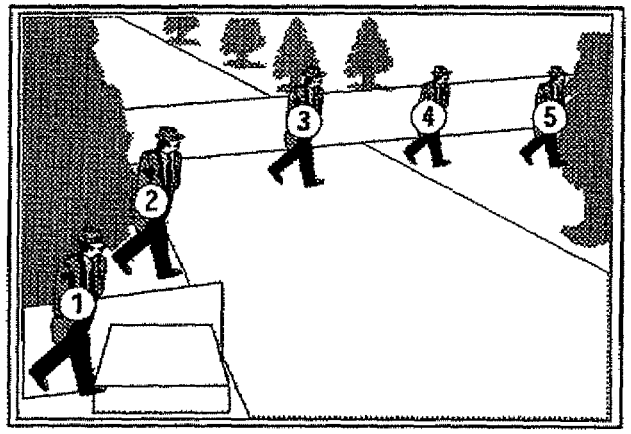
(b) Traveling Path of Object
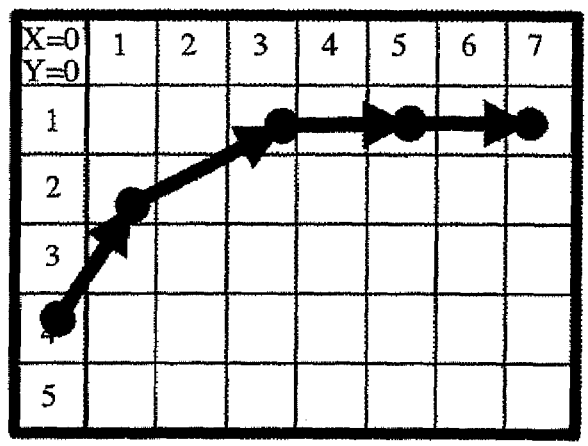
(c) Holding of Information about Traveling Path in Each Block Area
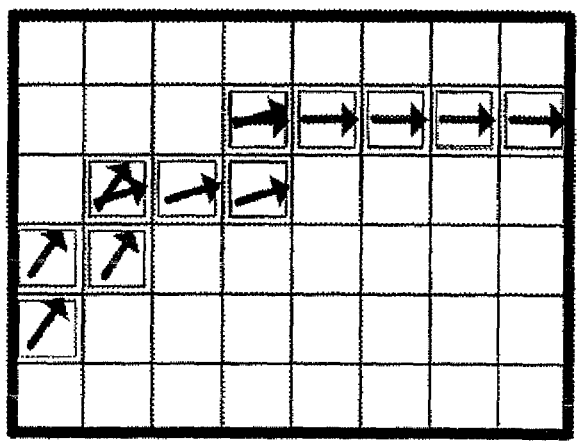

FIG. 5
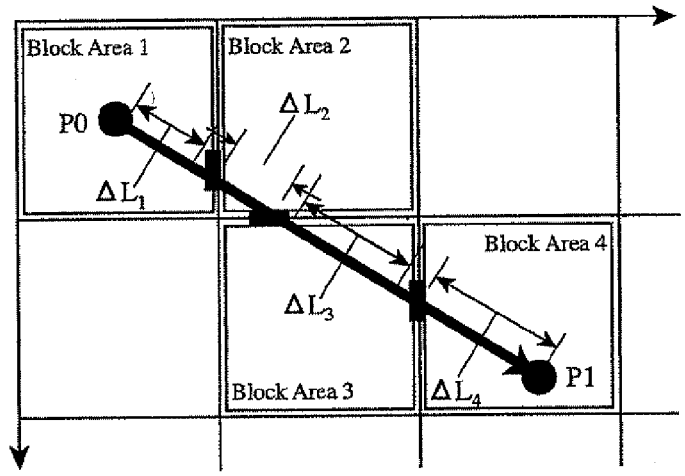
FIG. 6
(a) Division of Information by Block Area
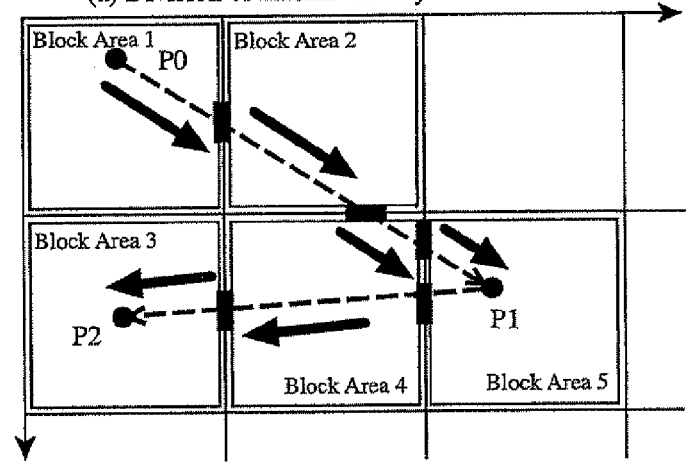
(b) Classification of Information about Traveling Direction
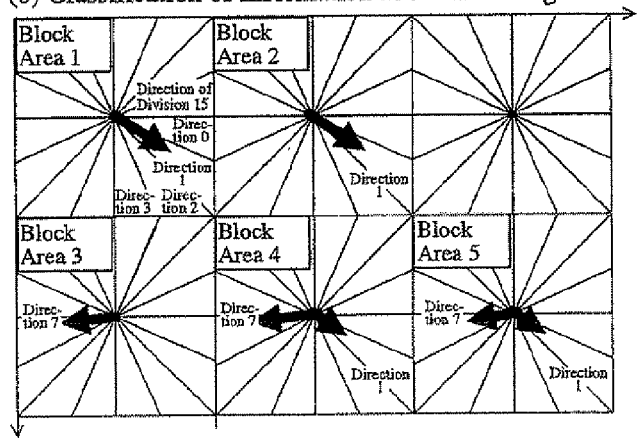

| | X=0 | X=1 | X=1 | ... | X=m-1 |
|---|---|---|---|---|---|
| Y=0 | Dir : 0=0<br>Dir : 1=1<br>Dir : 2=0<br>... | Dir : 0=0<br>Dir : 1=1<br>Dir : 2=0<br>... | Dir : 0=0<br>Dir : 1=0<br>Dir : 2=0<br>... | | Dir : 0=0<br>Dir : 1=0<br>Dir : 2=0<br>... |
| Y=0 | Dir : 0=0<br>...<br>Dir : 7=1<br>... | Dir : 0=0<br>Dir : 1=1<br>Dir : 7=1<br>... | Dir : 0=0<br>Dir : 1=1<br>Dir : 7=1...<br> | | Dir : 0=0<br>Dir : 1=0<br>Dir : 2=0<br>... |
| Y=n-1 | | | | | |

FIG. 9
(a) Specification of Passing Position and Direction
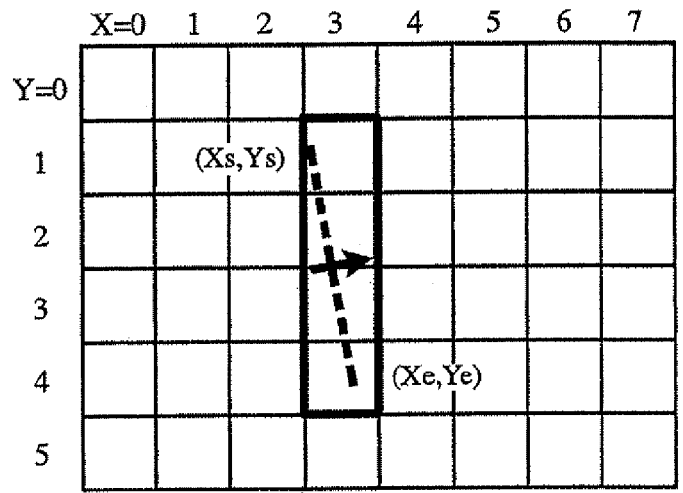
(b) Angle Range to Be Monitored
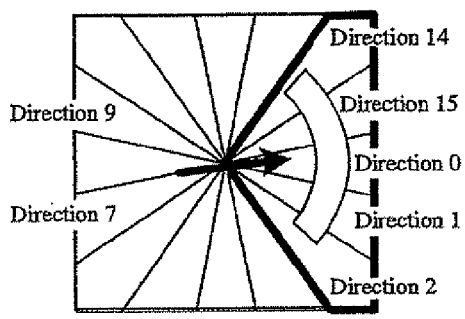
FIG. 10
(a) Specification of Traveling Route
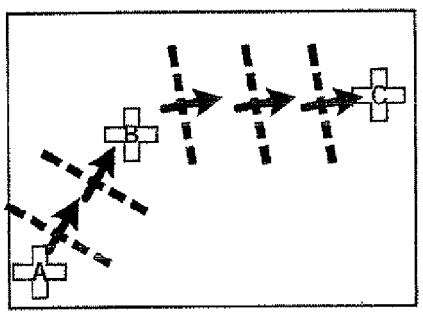
(b) Specification of Right Turn
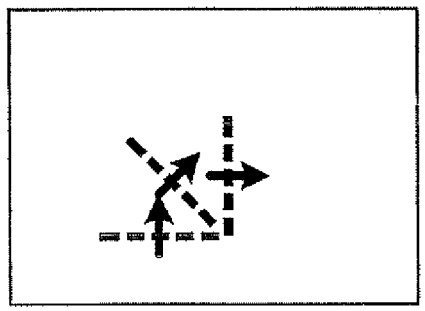

(a) Example of Image in Which Object to Be Shot Is Moving in Slanting Direction (b) Example of Size of Block Area (a) Yet-To-Be-Transformed Image  (b) Transformed Image (a) Yet-To-Be-Transformed Image  (b) Transformed Image

IMAGE SURVEILLANCE/RETRIEVAL SYSTEM

BACKGROUND OF THE INVENTION

1. Field of the Invention

The present invention relates to an image surveillance/retrieval system which surveils an image inputted from a surveillance camera on a predetermined condition, and which retrieves an image recorded therein according to a predetermined query.

2. Description of Related Art

In a prior art image surveillance system for security applications and so on for protecting persons and facilities from a suspicious person and an offender, a watcher always surveils many camera images visually for a long time with a very heavy load and with a low degree of efficiency. To solve this problem, there have been provided various ideas for extracting a scene in which a specific event occurs from an inputted image by carrying out image processing on the image, as disclosed in patent reference 3, and then providing information to attract the attention of the watcher for the watcher. To be more specific, there have been provided an intrusion surveillance system and so on for extracting a moving object, such as a person, from an inputted image by performing image processing on the image, and for issuing an alarm when this moving object intrudes into an area corresponding to an on-screen area which is specified in advance and then stays in the area for a specified time or more.

It seems that although such prior art systems can reoutput a list of detection results later after recording a detection result at a time of carrying out a detection in real time according to a query which is specified in advance, there are few systems which can change retrieval queries, such as a detection location and a staying time, after the detection, so as to retrieve a desired detection result again. In contrast, a prior art surveillance system disclosed in patent reference 1 keeps track of a moving object extracted from an inputted image and then records information about movements of the moving object. It therefore seems that the prior art surveillance system can change retrieval queries for the recorded time and space information after the detection so as to retrieve a desired record again.

Patent reference 2 discloses a method of dividing an image display screen into a plurality of partition regions, keeping tack of a moving object extracted from an image, and holding and displaying information about the traveling path of the moving object on a partition-region by-partition-region basis. It seems that the function of displaying the traveling path information operates at a high speed.

The surveillance system disclosed in patent reference 1 uses, as a method of holding information about the traveling path of the moving object, a method of holding, as an alpha map, all the positions of the moving object in image frames or a method of approximating the traveling path information with a spline function, and then holding the coefficients of the spline function. However, since the holding of the traveling path information using the former method is to substantially hold all images resulting from extraction of the moving object from the image frames through image processing and so on, the held information has a very large size. In a case of using the latter method, very complicated calculations are generally needed in order to represent the traveling path information about the traveling path of a moving object which is moving on the screen intricately with an equation, and therefore the implementation of the latter method is difficult in the case in which it is impossible to keep track of the moving object unless the processing load can be reduced, as in the case in which the inputted image is a live image and must be analyzed in real time. Also when retrieving a desired record, the surveillance system must determine whether each moving object matches with a certain retrieval query by performing a complicated higher-order polynomial arithmetic operation. Therefore, it may be difficult for the prior art surveillance system to retrieve a large amount of data at a high speed.

On the other hand, since the prior art surveillance system disclosed in patent reference 2 uses, as the holding method of holding the traveling path information about each moving object, a method of dividing an image display screen into a plurality of partition regions, and holding information about the traveling path of a moving object on a partition-region-by-partition-region basis, the prior art surveillance system can carry out information processing with a relatively light load. However, in patent reference 2, there is a reference made to holding of information about the staying time of the moving object in each partition region, while there is no reference made to any other information. Furthermore, there is a reference made to a method of displaying the information about the staying time, as well as the information about the staying time, while there is no reference made to retrieval based on a query.

[Patent Reference 1]
  JP, 2004-64433,A (see paragraph numbers 0016 to 0020)

[Patent Reference 2]
  Japanese patent No. 3601951 (see paragraph numbers 0020 to 0029)

[Patent Reference 3]
  JP, 6-22318,A (see paragraph numbers 0006 to 0009)

A problem with the prior art image surveillance/retrieval systems constructed as mentioned above is that they cannot carry out any processing at a high speed and therefore cannot raise the efficiency of the image surveillance operation.

SUMMARY OF THE INVENTION

The present invention is made in order to solve the above-mentioned problems, and it is therefore an object of the present invention to provide an image surveillance/retrieval system which can carry out any processing at a high speed and therefore can raise the efficiency of the image surveillance operation.

In accordance with the present invention, there is provided an image surveillance/retrieval system including: an image input unit for inputting image data; an object processing unit for dividing each image frame of the image data into a plurality of block areas, for detecting each individual object from each image frame, for extracting, as one object, a series of appearances of each identical object in a plurality of image frames, and for extracting features of the extracted object as metadata for each of the plurality of block areas; a metadata storage unit for storing the metadata for each of the plurality of block areas which is extracted by the object processing unit; a query input unit for inputting a real-time detection query or a postretrieval query; a real-time detection processing unit for comparing the metadata for each of the plurality of block areas which is extracted by the object processing unit with the real-time detection query inputted by the query input unit, and for detecting an object which satisfies the real-time detection query; a postretrieval processing unit for comparing the metadata for each of the plurality of block areas which is stored in the metadata storage unit with the postretrieval query inputted by the query input unit, and for retrieving an object which satisfies the postretrieval query; and a display unit for displaying either the object detected by the real-time detection processing unit or the object retrieved by the postretrieval processing unit.

Therefore, the present invention offers an advantage of being able to carry out any processing at a high speed and to raise the efficiency of the image surveillance operation.

Further objects and advantages of the present invention will be apparent from the following description of the preferred embodiments of the invention as illustrated in the accompanying drawings.

BRIEF DESCRIPTION OF THE DRAWINGS

FIGS. 3(a) and 3(b) are diagrams showing an example of a method of holding metadata about traveling path information in the image surveillance/retrieval system in accordance with embodiment 1 of the present invention;

FIGS. 4(a) to 4(c) are diagrams explaining the extraction of an object and metadata in the image surveillance/retrieval system in accordance with embodiment 1 of the present invention;

FIG. 5 is a diagram explaining a traveled distance and a travel time in each block area for each block area in the image surveillance/retrieval system in accordance with embodiment 1 of the present invention;

FIGS. 6(a) and 6(b) are diagrams explaining a method of holding traveling direction information in the image surveillance/retrieval system in accordance with embodiment 1 of the present invention;

FIGS. 9(a) and 9(b) are diagrams explaining a pass of an object in a specific area in the image surveillance/retrieval system in accordance with embodiment 1 of the present invention;

FIGS. 10(a) and 10(b) are diagrams explaining a case where a plurality of real-time detection queries are set in the image surveillance/retrieval system in accordance with embodiment 1 of the present invention;

DETAILED DESCRIPTION OF THE PREFERRED EMBODIMENTS

Embodiment 1

Figure 1:
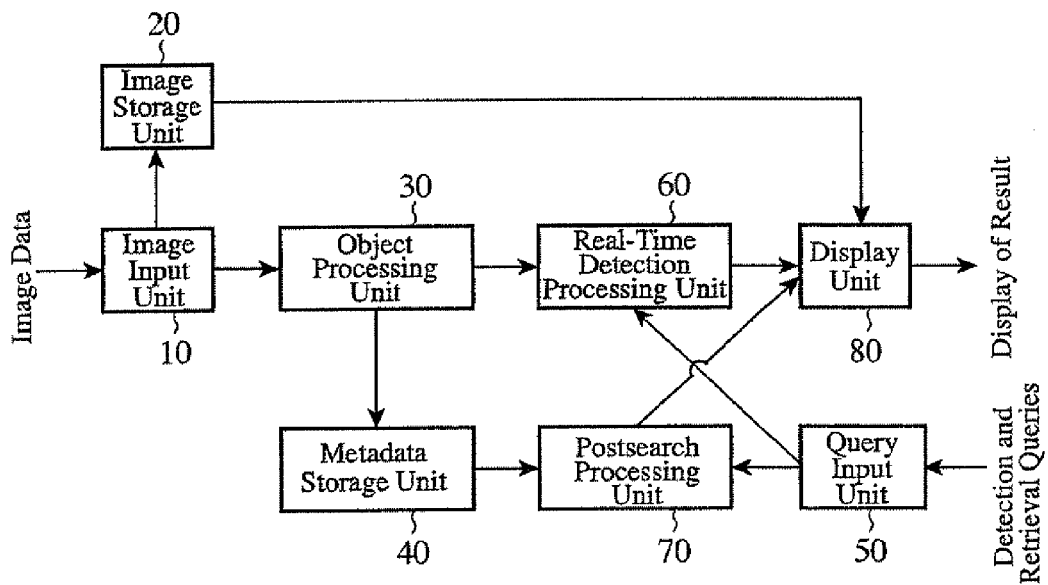
FIG. 1 is a block diagram showing the structure of an image surveillance/retrieval system in accordance with embodiment 1 of the present invention.

FIG. 1 is a block diagram showing the structure of an image surveillance/retrieval system in accordance with embodiment 1 of the present invention. This image surveillance/retrieval system is provided with an image input unit 10, an image storage unit 20, an object processing unit 30, a metadata storage unit 40, a query input unit 50, a real-time detection processing unit 60, a postretrieval processing unit 70, and a display unit 80. The image surveillance/retrieval system can be built in an environment where processing is carried out by a computer, such as a personal computer or a workstation. As an alternative, the image surveillance/retrieval system can be so constructed that some of the components shown in FIG. 1 exist at a physical distance from the remaining part, and sequentially carry out the processing at the remote place through a communication function, such as a LAN (Local Area Network) or a public network.

The image input unit 10 receives an input of image data transmitted thereto from a video camera or an image recording and reproducing device, or via a network, such as a LAN or a public network, and then transmits the inputted image data to the image storage unit 20 and object processing unit 30 located therebehind. In general, the inputted image data can be either data about a live image currently being captured by shooting an object to be shot using a video camera or data about an image which was recorded once in the past.

The image input unit 10 has an A/D (Analog-Digital) conversion function of, when receiving image data inputted from equipment such as an analog video camera, converting the image data into digital data. In contrast, when receiving image data which has been digitized via a LAN or the like, the image input unit 10 does not need to have such an A/D conversion function, and therefore carries out a communications protocol process of serving as a physical and logical interface so as to extract only an image-data component from the received digital image data.

The image storage unit 20 stores the image data inputted to the image input unit 10 therein, and holds the image data as a video source in order to refer to the original image data when carrying out a display of results later using the display unit 80, or in order to play back a recorded image about a desired time zone on the basis of a displayed processing result. The image storage unit 20 can be implemented via an electronic medium, such as an HDD (Hard Disk Drive) or a RAM (Random Access Memory), so that it can be easy to get random access to information about a desired time.

The object processing unit 30 divides each image frame of the image data inputted by the image input unit 10 into a plurality of block areas, detects each individual object from each image frame of the image data, extracts, as one object, a series of appearances of each identical object over a plurality of image frames, and then extracts features of this object (i.e., related information about the object) as metadata for each block area. This function of the object processing unit will be explained below. In this specification, an object is referred to as an individual object to be surveiled, such as a series of appearances of an identical person or an identical vehicle which have been captured over a plurality of image frames of the inputted image.

In the object extracting processing, the object processing unit 30 cuts out each individual object captured in the image data transmitted from the image input unit 10 from the background image first, and further recognizes a time period during which each identical object has been captured over a plurality of image frames to define the time period as one image time period unit and to associate a series of appearances of each identical object captured in the image data during this image time period unit with one object. Each image frame is simply referred to as a frame from here on. Although there may be cases where information about only either one of two fields is used when the image data is inputted using one of some types of input device, each image frame is generically called a frame.

Typically, the method of cutting out each individual object captured in the image data from the background image, and recognizing a time period during which each individual object has been captured over a plurality of image frames can be automatically executed using an image processing technique such as an image difference extraction technique disclosed in patent reference 3 or a template retrieving technique. As an alternative, it can be considered that the method of cutting out each individual object captured in the image data from the background image, and recognizing a time period during which each individual object has been captured over a plurality of image frames is partially executed through a human process when necessary.

Figure 2:
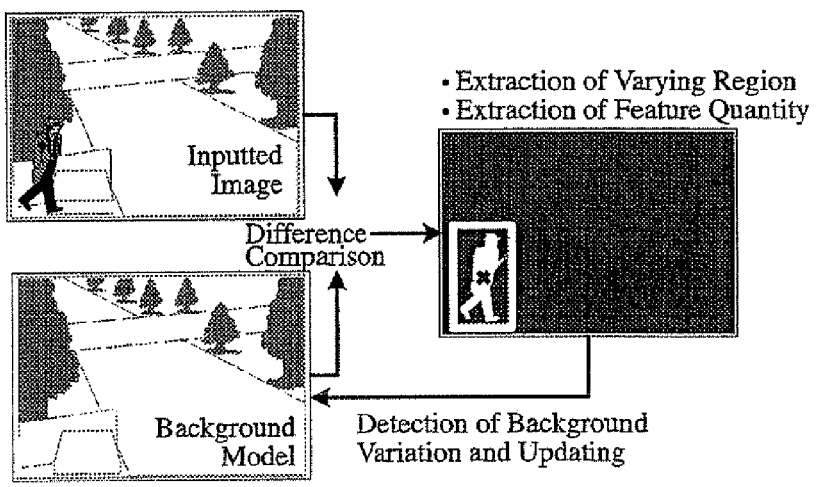
FIG. 2 is a diagram showing an extraction of a moving object in the image surveillance/retrieval system in accordance with embodiment 1 of the present invention.

FIG. 2 is a diagram explaining an example of extraction of a moving object from the inputted image data. In the example using an image difference extraction technique, one or more varied regions are extracted from the inputted image on the basis of the difference between the inputted image and the background model image for this inputted image, and feature quantities, like a bounding box containing the one or more varied region and the position of the center of gravity of the one or more varied regions, are extracted. In the example shown in FIG. 2, results of the extraction of the one or more varied regions are fed back and the background model is then updated.

In the metadata extracting processing, the object processing unit 30 extracts the features of each object every one image time period in the form of metadata. Generally, it can be assumed that the method of extracting the features including the area and position of each object, and the traveling path of each object is automatically executed using the above-mentioned image processing technology. As an alternative, it can be considered that the method of extracting the features including the area and position of each object, and the traveling path of each object is partially executed through a human process when necessary.

In accordance with this embodiment 1, there can be provided, as a method of holding metadata at the time of extracting the metadata, especially the traveling path information, the following method. First, each image frame (or image screen) of the image data inputted from the image input unit 10 is divided into a plurality of block areas, and all of the traveling direction of each object in each block area, the distance which each object has traveled along the traveling direction in each block area, and the time required for each object to travel in each block area, or any one or more of them are held, as the traveling path information about each object, for each block area.

FIGS. 3(a) and 3(b) are diagrams showing an example of the method of holding metadata about the traveling path information. In this example, each image frame (or image screen) is divided into a total of m×n rectangular block areas in which m rectangular block areas are running in a direction of its width (i.e., a direction of an X-axis), and n rectangular block areas are running in a direction of its height (i.e., a direction of a Y-axis), as shown in FIG. 3(a), and information about the traveling direction, the traveled distance, and the travel time is held in each element of an information array which corresponds to each of the plurality of block areas, as shown in FIG. 3(b). The values of m and n can be determined according to both the distance between the object to be shot and the camera, the camera's angle of view, the size and speed of the object to be shot, or a desired degree of accuracy of retrieval, and a memory size required to hold the metadata, etc.

Although an explanation of this example will be made assuming that each block area is shaped like a rectangle such as a square, more generally, each block area does not necessarily need to be shaped like a rectangle and can be shaped like another polygon, such as a hexagon. In addition, in the case in which each block area holds information about the traveling direction of an object, any two block areas which are adjacent to each other are not divided at the boundary between them, and, instead, a demarcation line can be established between any two block areas so that they overlap each other, i.e., an identical partial area is included in each of them, as in a case where any two adjacent pages overlap each other in the vicinity of the boundary between them in an atlas or the like.

FIGS. 4(a) to 4(c) are diagrams explaining the extraction of an object and metadata. In the extraction of an object as shown in FIG. 4(a), it is determined that a moving object which has been detected five times over a plurality of frames of the inputted image through the image processing is an identical moving object that has moved from the lower left corner of the screen toward the upper right corner of the screen, and this series of detections of the moving object is extracted while being associated with one object. In this case, for each block area in where the moving object has been detected, a representative point having a predetermined definition, such as the center-of-gravity point of each block area, is determined.

Then, as shown in FIG. 4(b), in a case where the image screen is divided into a total of 48 rectangular block areas in which 8 rectangular block areas are running in the direction of its width (i.e., the direction of the X-axis), and 6 rectangular block areas are running in the direction of its height (i.e., the direction of the Y-axis), the traveling path of the extracted object is drawn by connecting the representative points of the block areas, in which the above-mentioned moving object has been detected, in order.

The representative point in each block area of an object can be determined using a method other than the above-mentioned method of selecting, as the representative point, the center-of-gravity point of each block area. For example, a method of selecting, as the representative point, a lower or upper end point of each block area can be used alternately in some cases. Furthermore, in the case in which the center-of-gravity point of each block area in which the object has been detected is selected as the representative point of the object in each block area, as shown in FIG. 4(a), variations in the precision of the extraction of the object through the image processing can be stabilized relatively. Furthermore, the method of selecting, as the representative point of the object in each block area, a lower end point of each block area can be combined with, for example, a proper shadow removing process. In this case, when the moving object is a person, since the position of his or her feet can be specified, it is relatively easy to grasp the position of the moving object on a plane of the location to be shot. In contrast, when an obstruction exists on the ground surface in the location to be shot, and the lower part of the moving object is often hidden by the obstruction, a traveling path which is stabilized relatively can be acquired by selecting an upper end point of each block area where the moving object has been detected as the representative point of each block area. Furthermore, in the case in which the height of this moving object can be estimated, a traveling path of the moving object on the ground surface can be acquired by determining a projected point by projecting the upper end point of each block area where the moving object has been detected on the ground surface and then selecting the projected point as the representative point of each block area. As an alternative, when carrying out a process of tracking a person using a geometric model representing the person's head or the like, for example, the center position of the head in each block area where the person has been detected can be selected as the representative point of each block area.

Furthermore, these different types of representative points, such as an upper end point and a lower end point of each block area where a moving object has been detected, can be used simultaneously and can be managed independently as a plurality of different pieces of information. As an alternative, the plurality of representative points of block areas where a moving object has been detected can be managed collectively. In the case that a moving object is managed for each block area using a single representative point, there is provided an advantage of being able to carry out the management and retrieval and verifying processing easily, and to reduce the memory size required for the holding of the information. In contrast, in the case that a plurality of representative points are managed independently, there is provided an advantage of being able to use a desired one of the plural pieces of representative point information, for example, information about the track of the feet or head of a person. As an alternative, in the case that the plurality of representative points of block areas where a moving object has been detected are managed collectively, not only the movement of the object can be shown by points and lines, but also the traveling path of the object can be represented with its width being determined according to the size of the object itself. In this case, when time information as will be mentioned below is integrated and held, an overlapped portion must be subtracted from the time information.

FIG. 4(b) shows, as the method of connecting the plurality of representative points of block areas where a moving object has been detected so as to draw the traveling path of the moving object, a method of simply connecting the plurality of representative points extracted for the moving object with segments, as in a case of drawing a line graph. In this case, the method of connecting the plurality of representative points can be implemented via very simple processing and with a light load. As a method which is not such a simple connecting method, a method including the following correction can be executed. Since each representative point extracted through the image processing includes an error dependent upon the precision of the image processing at the time of the extraction, zigzag fluctuations may easily occur in the traveling path extracted from the image even if the moving object moves in a straight line. In order to correct for such fluctuations, when determining a certain representative point, the position coordinates of a predetermined number of points including one or more past points and one or more future points are averaged so that the traveling path is smoothed. As an alternative, since each representative point extracted can only be specified as a discrete position (in the case of FIGS. 4(a) and 4(b), five discrete positions are specified), these discrete values can be approximated by a curve which smoothes them continuously if there is a margin in the processing speed of the image surveillance/retrieval system.

The information about the thus generated traveling path is divided into a plurality of pieces of information on a block-area-by-block-area basis, and is held, as shown in FIG. 4(c) showing the holding of the information about the traveling path for each block area.

FIG. 5 is a diagram explaining a traveled distance and a travel time in each block area, and shows an example of the method of dividing the connected plural pieces of traveling path information as shown in FIG. 4(b) into a plurality of pieces of information on a block-area-by-block-area basis, as shown in FIG. 4(c). In FIG. 5, two representative points P0 and P1 of the moving object are shown as a part of the traveling path of the object, and the traveling path between the two points is expressed as a segment which connects the two points with each other. This traveling path between the two points passes through four block areas 1, 2, 3, and 4 shown in the figure. In this case, the traveling path information has a given minimum decomposed particle size which is expressed by the coordinate position and time of each of the discrete points P0 and P1, and variations in the speed of the moving object when it was moving between the two points are not known. Therefore, assuming that the moving object has moved in a straight line at a constant speed between the two points P0 and P1, the distance between P0 and P1 is divided into four segments according to the ratio among $\Delta L1$, $\Delta L2$, $\Delta L3$, and $\Delta L4$ in the figure. The distance between the two points (i.e., traveled distance) and time (i.e., travel time) required for the moving object to move between the two points are distributed among the plurality of above-mentioned block areas according to these divided segments. In this case, $\Delta L1$, $\Delta L2$, $\Delta L3$, and $\Delta L4$ are equal to the lengths of parts of the segment P0-P1 which are divided by the boundaries of the block areas, respectively.

FIGS. 6(a) and 6(b) are diagrams explaining a method of holding information about the traveling direction of a moving object in each block area. In the example shown in FIG. 6(a), three representative point P0, P1, and P2 are provided, and a segment is connected between P0 and P1 and another segment is connected between P1 and P2 so that a traveling path from P0, via P1, to P2 is produced. This traveling path among the three points passes through five block areas 1, 2, 3, 4, and 5 shown in the figure. As in the case of FIG. 5, each of the segment P0-P1 and the segment P1-P2 is cut and divided into shorter segments by points of intersection with the boundaries of block areas through which each of them passes, respectively, and the direction of each of the shorter segments of the traveling path, which passes through each block area, is examined. One shorter segment of the traveling path passes through each of the block areas 1, 2, and 3, and two shorter segments of the traveling path pass through each of the block areas 4 and 5. The reason why two shorter segments of the traveling path pass through the block area 5 is because the traveling direction has changed before and after the representative point P1 of the object, and therefore the traveling path is divided into the two segments: one extending in the front of P1 and the other one extending in the back of P1. Although not shown in FIGS. 6(a) and 6(b), in the case that the traveling direction successively changes in the same block area two or more times, the number of divided segments of the traveling path in the block area can be similarly increased before and after the representative point of the block area.

In FIG. 6(b) it is examined in which one of 16 parts into which the entire azimuthal angle range of 360 degrees is equally divided the shorter segment is oriented in each block area. In this example, in each of the block areas 1 and 2, the shorter segment is oriented in direction 1, in the block area 3, the shorter segment is oriented in direction 7, and in each of the block areas 4 and 5, the shorter segment is oriented in direction 7.

The method of holding traveling direction information about a block area in which the traveling direction has changed, like the block area 5 in the above-mentioned example, can be simplified by, for a block area in which the traveling direction has changed, holding only information about the direction of a segment which intersects the boundary between the block area and another block area for the first time (in the case of the block area 5, direction 1), or holding only information about the direction of a segment which intersects the boundary between the block area and another block area for the last time (in the case of the block area 5, direction 7), for example. In the case as shown in FIG. 6(a), when a movement of an object has been found out somewhere in the block areas, the directions of all segments extracted using the above-mentioned method are recorded as metadata. When using the method of holding only information about the direction of a segment which intersects the boundary between a block area and another block area for the first time, information about a certain direction in which the object is determined to move somewhere on the boundary is recorded instead of information about the traveling direction of the object at a certain location within the block area.

The above explanation is made as to the example in which a plurality of discrete representative points are connected with segments. As an alternative, the plurality of discrete representative points can be approximated by, for example, a curve which smoothes them continuously, as previously explained. In this case, the same processing only has to be performed on each block area through which the curved traveling path passes. However, in general, since the traveling direction of the object always changes every time it travels every section between a point of intersection of the traveling path and the boundary between block areas and the next point of intersection, it is preferable to collect pieces of traveling direction information to be stored about the direction of a segment connecting between the points of intersection. It is also preferable to calculate the traveled distance and travel time of the moving object in each block area just from the traveling path which is approximated by the curve, or approximating the traveling path in each block area with a segment connecting the point of intersections of the curve and the boundaries of each block area.

Figures 7, 8:
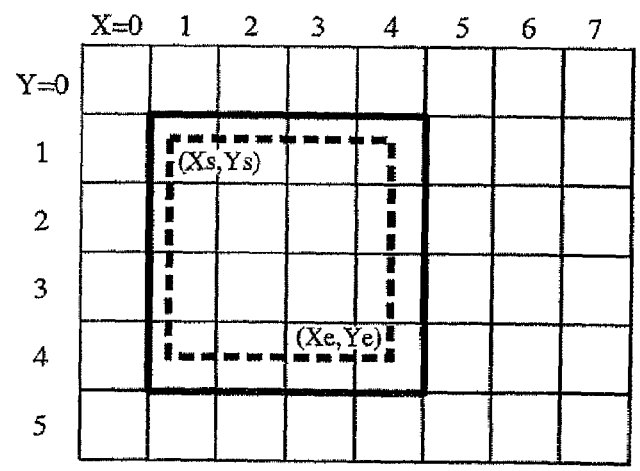
FIG. 7 is a diagram showing an example of a method of holding metadata about the traveling direction information in the image surveillance/retrieval system in accordance with embodiment 1 of the present invention.
FIG. 8 is a diagram explaining the staying time of an object in a specific area in the image surveillance/retrieval system in accordance with embodiment 1 of the present invention.

FIG. 7 is a diagram showing an example of the method of holding the metadata about the traveling direction information. The block areas 1, 2, 3, 4, and 5 shown in FIG. 6(a) correspond to block areas (X, Y)=(0, 0), (1, 0), (0, 1), (1, 1), and (2, 1) shown in FIG. 7, respectively. However, as shown in FIG. 3(a), the block area (X, Y) represents a block area which is the X-th block area when counted from zero along the horizontal axis (X) and which is the Y-th block area when counted from zero along the vertical axis (Y) in the case that the screen is divided into the plurality of block areas. In this example, an information holding area is disposed to store information indicating one of 16 equal parts into which the entire azimuthal angle range of 360 degrees is divided in each block area. In the case of each of the block areas (0, 0) and (1, 0), since it is clear that there has been a movement of the moving object only in the direction (Dir) of 1, the corresponding value is set to 1 while the other values associated with the other directions are all set to 0. In the case of the block area (0, 1), only a value corresponding to the direction Dir=7 is set to 1 while the other values associated with the other directions are all set to 0. In the case of each of the block areas (1, 1) and (2,1), only values corresponding to the directions Dir=1 and 7 are set to 1 while the other values associated with the other directions are all set to 0. Thus, Dir whose value is set to 1 in each block area shows that there has been a movement of the moving object in the corresponding direction in each block area, while Dir whose value is set to 0 in each block area shows that there has been no movement of the moving object in the corresponding direction in each block area For example, either binary information of 0 or 1 which indicates whether there has been any movement in the direction even once or the number of times of detection of movements which is obtained by summing a value corresponding to the number of times that a movement has been detected in each direction can be held as the value of each Dir. In the former case, there is an advantage of being able to reduce the size of held data. In the latter case, there is an advantage of being able to also have information including the frequency of movements of each object in each block area.

Furthermore, instead of summing the number of times that a movement of each object has been detected, either the traveled distance or travel time of each object can be summed and held so that both the traveling direction information and either the traveled distance information or the travel time information can be held collectively. By using such a data holding method, the total data size can be reduced.

In these examples, as the division number indicating either the number of the plurality of block areas into which the screen is divided or the number of the plurality of parts into which the entire azimuthal angle range of 360 degrees is divided, each part being used for holding the traveling direction information in each block area, increases, the held traveling path information can have a higher degree of accuracy. In contrast, as the division number decreases, the amount of metadata size to be held can be reduced, and the verification and determination processing can be simplified.

The metadata storage unit 40 stores the metadata for each block area which is extracted by the object processing unit 30. At that time, the metadata storage unit 40 only has to store the metadata in such a manner that it can be easily processed through subsequent processing. For example, when the image surveillance/retrieval apparatus uses a computer having a file system, it is preferable that the metadata storage unit uses a method of storing the metadata as a metadata file.

In general, as the metadata in stored the metadata storage unit, a plurality of pieces of information effective in building a system which retrieves an image with information about the traveling path being held and displays the image, as well as the traveling direction indicating where and how the object has passed through, the traveled distance, and the travel time information indicating how long the object has been staying at that time, can be held. For example, such a plurality of pieces of information can include head frame information indicating the time when each object was captured into the image for the first time, final frame information indicating a frame in which each object was captured into the image for the last time, and specific representative frame information indicating a frame which satisfies a query that each object has the largest on-screen area during a corresponding image time period or a query that each object's face is seen the most clearly in the image in the case that the object is a human being. In this case, frame information is pointer information specifying a frame in question, and can be implemented with a frame number, a time stamp, or the like.

The features of an object itself include the average size of the object within a certain time period, shape information including the height and width of the object, and a height-to-width ratio, and color information. Furthermore, as examples of detailed information, there can be provided position coordinate information about the object on the screen in each frame in which the object has been captured, and bit map information about a region which corresponds to a person's shape in the case that the object area, i.e., the object is a human being. In this case, the position coordinate information indicates, for example, the position of the representative point of the object, which is defined as the center of gravity, a lowermost end, an uppermost end, or the like of the object, or a position associated with either a closed curve, like an ellipse or a quadrangle, circumscribing the object, or a closed curve, like an ellipse or a quadrangle, containing a part of the object having a certain percentage of the area of the object.

The above-mentioned feature quantities can be extracted directly from the inputted image through the image processing. Furthermore, there are examples of metadata which are defined as indirect feature quantities, as will be mentioned as below. Such metadata can include information indicating the type of the object, for example, information indicating whether the object is a human being or a vehicle, which is acquired on the basis of the shape of the object and the features of movements of the object which are extracted from the inputted image, and, when the object is a human being, information about the posture of the object indicating, for example, whether the object is sleeping or standing and information about the race, sex, age, etc. of the object which are acquired from the figure of the object, the shape of the object's face, etc. Furthermore, when the image surveillance/retrieval system is so constructed as to verify whether a target object matches an individual which has been registered in advance into the system on the basis of the features of the object, for example, the shape of the person's face, or when the image surveillance/retrieval system can acquire information specifying the target object which is an individual person from an ID card for identifying his or her individual ID, a tag, or the like without using any image data information, information indicating the individual ID or the name which the target object has can be held as metadata about the object. Typically, the object processing unit extracts such feature quantities using an image processing algorithm intended for the extraction. As an alternative, it can be considered that the method of extracting such feature quantities is partially executed through a human process when necessary.

When carrying out real-time detection, the query input unit 50 accepts an input of a real-time detection query from the user, and transmits it to the real-time detection processing unit 60. When carrying out a postretrieval, the query input unit 50 accepts an input of a postretrieval query from the user and transmits it to the postretrieval processing unit 70. For example, the user can perform such an input with either a user interface, such as a keyboard, a mouse, or a touch panel, for use in a general personal computer or an input device, such as a special-purpose button or dial.

The real-time detection processing unit 60 verifies whether the metadata for each block area, which is extracted by the object processing unit 30, satisfies the real-time detection query transmitted from the query input unit 50, and, when detecting an object which matches the real-time detection query, outputs an object detection event in real time by transmitting it to the display unit 80.

Hereafter, an example of a query set about the staying time of an object which is provided as the real-time detection query will be explained. FIG. 8 is a diagram explaining the staying time of an object in a specific area. Hereafter, a method of detecting an object which has been staying for the specific staying time in the specific area on the screen will be explained. For example, settings are made so that the lower limit of the specific staying time is set to 10 seconds, and therefore only an object which has been staying for "10 seconds or longer" in a rectangular area defined by on-screen two points (Xs, Ys) and (Xe, Ye) at the upper left and lower right corners thereof, as shown by a dotted line of FIG. 8, can be detected. Because information about the staying time in the rectangular area is held in the form of an accumulated total travel time which is obtained by summing the travel time of the object for each block area in the metadata, the surveillance of the travel time information about the object is aimed at block areas which can include this specified rectangular area completely. That is, in each of the block areas (1,1), (2,1), (3,1), (4,1), (1,2), (2,2), (3,2), (4,2), (1,3), (2,3), (3,3), (4, 3), (1, 4), (2, 4), (3, 4), and (4, 4), having a total number of 16, the travel time information about the object is surveiled, and, when the accumulated total travel time which is obtained by summing the travel time for each block area exceeds 10 seconds, it is determined that the object in question satisfies the real-time detection query.

Since the staying time information is held on a block-area-by-block-area basis, when the specific rectangular area have boundaries which do not match those of block areas completely, for example, only block areas which are included completely in the specific rectangular area, in the above-mentioned example, the following four block areas: (2, 2), (3, 2), (2, 3), and (3, 3) can be defined as a target area to be surveiled. As an alternative, block areas each of which has a part or whole included in the specific rectangular area and in each of which the percentage of the area of the part or whole to the area of each block area is equal to or larger than a predetermined value can be defined as a target area to be surveiled.

When settings are made so that the upper limit of the specific staying time, as well as the lower limit, are defined, and only an object which has been staying for a time period which is "equal to or longer than 10 seconds and is equal to or shorter than 20 seconds" in the specific rectangular area can be detected, for example, the determination of whether the object in question satisfies the staying time query is carried out in a state in which the traveling path information is not determined yet in the case in which the real-time detection is carried out. It is therefore preferable that the determination of whether the object in question satisfies the staying time query is carried out in a state in which the traveling path information has been determined after the object disappeared.

Next, an example of passage information which is provided as the real-time detection query will be explained. FIG. 9 is a diagram for explaining passage of an object in a specific area. Hereafter, a method of detecting an object which has passed through the on-screen specific area toward a specific direction will be explained. For example, settings are made so that only an object which has crossed a specific segment connected between two points (Xs, Ys) and (Xe, Ye) on the screen, shown by a dotted line of FIG. 9(a), and which has passed through the specific area from a leftward direction toward a rightward direction on the screen can be detected. Block areas which can include the specific segment completely are defined as a target area to be detected. In the example of FIG. 9(a), in the following four block areas: (3, 1), (3, 2), (3, 3), and (3, 4), information about the traveling direction of the object is surveiled, and, when a movement of the object in the specific direction is detected in any one of the four block areas, it is determined that the object satisfies the real-time detection query.

Furthermore, an example of a method of determining whether an object satisfies a query about the traveling direction will be explained. FIG. 9(b) is a diagram showing a case in which the traveling direction information about the traveling direction of an object within each block area to be surveiled is managed for each of 16 parts into which the entire azimuthal angle range of 360 degrees is divided. When a query that only an object which has passed through the segment shown by the dotted line of FIG. 9(a) from a leftward direction toward a rightward direction is allowed to be detected is set up in advance, the direction of the normal to this segment can be considered to be the direction of passage of a detected object and an arrow shown in the center of FIG. 9(b) indicates a specific traveling direction. Therefore, there can be provided a method of notifying a detection of an event when detecting a movement of an object toward a direction lying in a given range including direction 0. However, when the entire azimuthal angle range of 360 degrees is divided more finely into parts for identifying the specific traveling direction, there is a possibility that only passage at a nearly perpendicular angle with respect to the specific segment shown by the dotted line satisfies the query. To solve this problem, a predetermined allowable angle can be provided for each of a right-hand side and a left-hand side of the specific traveling direction. For example, when a predetermined allowable angle of 45 degrees is provided for each of the right-hand side and left-hand side of the specific traveling direction in FIG. 9(b), a range enclosed by a thick line, i.e., a range including direction 14, direction 15, direction 0, direction 1, and direction 2 is a target area to be surveiled.

As in the case of the detection of the staying time, since the traveling direction information is held on a block-area-by-block-area, all block areas which completely include the specific segment are defined as a target area to be surveiled. As an alternative, block areas each of which has a part of the specific segment, the percentage of the length of the part to the total length of the specific segment being equal to or larger than a predetermined value, can be defined as a target area to be surveiled.

Next, an example of a query set about the traveled distance of an object which is provided as the real-time detection query will be explained. An example of the query set about the staying time of an object in a specific area is mentioned previously with reference to FIG. 8. Similarly, in the case in which traveled distance information about each object is stored, as metadata, for each block area, the setting of a query that only an object which has traveled more than a specific distance within a specific area is allowed to be detected can be explained with reference to FIG. 8. For example, settings are made so that the lower limit of the specific distance is set to 100 pixels, and therefore only an object which has traveled a distance which is equal to "100 pixels or longer" in a rectangular area defined by on-screen two points (Xs, Ys) and (Xe, Ye) at the upper left and lower right corners thereof, as shown by the dotted line of FIG. 8, can be detected. In this example, pixels are defined as the unit of distance. In the case in which the screen size is shown by the number of pixels such as 640×480 in which 640 pixels are running in a horizontal direction (i.e., the direction of an X-axis) and 480 pixels are running in a horizontal direction (i.e., the direction of a Y-axis), for example, the traveled distance of any object which has traveled on the image screen can expressed as a number of pixels.

Since the information about the traveled distance of each object is held in the form of an accumulated total traveled distance which is obtained by summing the traveled distance of each object for each block area in the metadata, the surveillance of the traveled distance information about each object is aimed at block areas which can include the specified rectangular area completely. That is, in each of the block areas (1,1), (2,1), (3,1), (4,1), (1,2), (2,2), (3,2), (4,2), (1,3), (2,3), (3, 3), (4, 3), (1, 4), (2, 4), (3, 4), and (4, 4), having a total number of 16, the traveled distance information about each object is surveiled, and, when the accumulated total traveled distance which is obtained by summing the traveled distance for each block area exceeds 100 pixels, it is determined that the object in question satisfies the traveled distance query.

Since the traveled distance information is held on a block-area-by-block-area, in the case in which the specific rectangular area have boundaries which do not match those of block areas completely, for example, only block areas which are included completely in the specific rectangular area, in the above-mentioned example, the following four block areas: (2, 2), (3, 2), (2, 3), and (3, 3) can be defined as a target area to be surveiled. As an alternative, block areas each of which has a part or whole included in the specific rectangular area and in each of which the percentage of the area of the part or whole to the area of each block area is equal to or larger than a predetermined value can be defined as a target area to be surveiled.

In the case in which settings are made so that the upper limit of the specific traveled distance, as well as the lower limit, are defined, and only an object which has traveled a distance which is "equal to or longer than 100 pixels and is equal to or shorter than 200 pixels" in the specific rectangular area can be detected, for example, the determination of whether the object in question satisfies the traveled distance query is carried out in a state in which the traveling path information is not determined yet in a case in which a real-time detection is carried out. It is therefore preferable that the determination of whether the object in question satisfies the traveled distance query is carried out in a state in which the traveling path information has been determined after the object disappeared.

Next, an example of a query set about the speed of an object which is provided as the real-time detection query will be explained. In the case in which the traveled distance information and travel time information about an object are stored in the metadata on a block-area-by-block-area basis, the average speed of the object can be calculated by calculating the ratio of the traveled distance information to the travel time information. Therefore, a method of detecting an object which has moved at a specific speed or higher within a specific area can be similarly explained with reference to FIG. 8. For example, settings are made so that the lower limit of the specific speed is set to 100 pixels per second, and therefore only an object which has moved at a speed which is equal to "100 pixels per second or higher" in a rectangular area defined by on-screen two points (Xs, Ys) and (Xe, Ye) at the upper left and lower right corners thereof, as shown by the dotted line of FIG. 8, can be detected.

Since the traveled distance information and travel time information about each object are held in the form of an accumulated total traveled distance which is obtained by summing the traveled distance of each object for each block area in the metadata, and in the form of an accumulated total travel time which is obtained by summing the travel time of each object for each block area in the metadata, the surveillance of the traveled distance information and travel time information about each object is aimed at block areas which can include the specified rectangular area completely. That is, in each of the block areas (1, 1), (2,1), (3,1), (4,1), (1,2), (2, 2), (3,2), (4, 2), (1,3), (2,3), (3,3), (4, 3), (1, 4), (2, 4), (3, 4), and (4, 4), having a total number of 16, the traveled distance information and travel time information about each object are surveiled, and, when the ratio of the accumulated total traveled distance to the accumulated total travel time exceeds 100 pixels per second, it is determined that the object in question satisfies the speed query. However, in this case, because there is a possibility that the average speed of the object which is obtained after the traveling path information about the object has been finally determined does not exceed 100 pixels per second, the repeatability cannot be insured for the case of carrying out the postretrieval. The determination using the average speed of the object is carried out at a stage where the traveling path of the object has been finally determined after the object disappeared.

Since each of the traveled distance information and travel time information is held on a block-area-by-block-area basis, in the case in which the specific rectangular area have boundaries which do not match those of block areas completely, for example, only block areas which are included completely in the specific rectangular area, in the above-mentioned example, the four block areas (2, 2), (3, 2), (2, 3), and (3, 3) can be defined as a target area to be surveiled. As an alternative, block areas each of which has a part or whole included in the specific rectangular area and in each of which the percentage of the area of the part or whole to the area of each block area is equal to or larger than a predetermined value can be defined as a target area to be surveiled.

Furthermore, there can be provided a method of, instead of calculating the average speed of the object for all block areas to be surveiled, calculating the average speed of the object for each of all the block areas to be surveiled to determine whether the average speed is equal to or higher than the lower limit of the specific speed.

As an alternative, settings are made so that the upper limit of the specific speed, as well as the lower limit, are defined, and only an object which has moved at a speed which is "equal to or higher than 100 pixels per second and is equal to or lower than 200 pixels per second" in the specific rectangular area can be detected, for example.

Next, an example of a combination of real-time detection queries will be explained. A plurality of real-time detection queries can be set up, and can be used in combination in such a manner that the relation between those real-time detection queries is defined by a logical operation, such as a logical OR operation or a logical AND operation. For example, when it is determined whether or not the logical OR of the plurality of real-time detection queries is satisfied, it is be determined that the target object satisfies the combination of the plurality of real-time detection queries if at least one of the plurality of real-time detection queries is satisfied. On the other hand, when it is determined whether or not the logical AND of the plurality of real-time detection queries is satisfied, it is determined that the target object satisfies the combination of the plurality of real-time detection queries if all of the plurality of real-time detection queries are satisfied. As an alternative, a higher-order combination of the plurality of real-time detection queries can be used.

FIG. 10 is a diagram explaining a case in which a plurality of real-time detection queries are set up. This figure shows a case in which a plurality of passage queries set about an object are set up. For example, as shown in specification of a moving path of FIG. 10(a), a plurality of passage queries are set for a plurality of locations A, B, and C, respectively. In this case, by making the satisfaction of all the passage queries an only condition of detection of a moving object, an object having a moving path extending from the location A to the location B, and from the location B to the location C can be detected. In addition, by shortening the length of a specific segment between any two adjacent locations on which passage queries are set, respectively, or by increasing the number of the combination of the passage queries, the specific moving path can be defined more finely. However, since each traveling direction information in accordance with this embodiment 1 does not necessarily have information about an occurrence time and occurrence order, such the time information and order information which are not recorded cannot be necessarily used. Therefore, even an object which has made such a complicated movement as a movement from the location B to the location C, then to the location A, and further to the location A, can be found out through the above-mentioned retrieval processing. Thus, since all objects that satisfy the desired queries including any objects which originally match the intention of the retrieval processing can be detected, no failure to retrieve any object which satisfies the desired queries occurs.

As shown in specification of a right turn of FIG. 10(b), in a case in which local passage queries are combined and the logical AND of them is set up as a combined query, an object which has made such a defined movement as a "right turn" or "left turn" at a specified position can be detected.

By making a higher-order combination of a plurality of queries, such an arbitrary query as "only an object which has passed through a location A in a rightward direction and has been staying in an area B or C for 10 seconds can be detected" can be set up.

The postretrieval processing unit 70 compares the metadata for each block area which is extracted by the object processing unit 30 and which is stored in the metadata storage unit 40 with the postretrieval query transmitted from the query input unit 50, and retrieves an object which satisfies the postretrieval query.

For example, in the case in which a staying time query as mentioned with reference to FIG. 8 is set up as the postretrieval query, the postretrieval processing unit 70 determines block areas to be surveiled from a specified area, and extracts, as postretrieval results, all objects each of which has a total staying time which is the sum of the staying times currently being held in all the determined block areas and which is equal to or longer than the lower limit of a specific staying time set to 10 seconds, like the real-time detection processing unit 60. In the case of the postretrieval processing, since the traveling path information about each object has been determined, settings can be made so that the upper limit of the specific staying timer as well as the lower limit, are defined, and only an object which has been staying for a time period which is "equal to or longer than 10 seconds and is equal to or shorter than 20 seconds" in the specific area can be detected, for example, In the postretrieval processing done by the postretrieval processing unit 70, because the same goes for the postretrieval using the traveled distance or the average speed, such a postretrieval query as a query that only an object which has traveled a distance which is "equal to or longer than 10 pixels and is equal to or shorter than 20 pixels" in the specific area can be detected, or a query that only an object which has moved at a speed which is "equal to or higher than 10 pixels per second and is equal to or lower than 20 pixels per second" in the specific area can be detected can be set up.

The display unit 80 produces an additional display of the information about each object which is event-detected by the real-time detection processing unit 60 one after another, and displays all objects retrieved by the postretrieval processing unit 70 at a time. In this case, the display unit 80 produces a display using a display device, like a display mounted in a computer system.

In the case of producing a display, the display unit 80 can superimpose and display the traveling path information about each extracted object on the on-screen image and can also superimpose and display all block areas specified in the query which is set up in the case of the real-time detection or postretrieval processing. In this case, there is an advantage of making it easy for the user to grasp movements of each object, and to recognize the reason why each object has been detected at a glance. In the case of the real-time detection, an image which is captured at the time of the detection of an event corresponding to the real-time detection query can be an image which is a target for the real-time detection. In contrast, in the case of the postretrieval, either an image which was captured at the time of the appearance or disappearance of an object in question or an image which was captured at such a predetermined time as a middle time within a time period during which the object has been captured can be an image which is a target for the postretrieval. There can be also provided a method of making the object processing unit 30 determine and incorporate information indicating an image which satisfies a predetermined query, for example, an image in which the object in question was captured when its on-screen size was the largest or an image in which the object in question was captured when it was located the closest to the center of the image into the metadata.

This display unit 80 can be implemented in a computer system in which the display unit is physically integral with other processing units. As an alternative, the image surveillance/retrieval system can be so constructed as to transmit real-time detection or postretrieval results to mobile terminal equipment at a remote place, like another computer or a mobile phone, so that the mobile terminal equipment can display the transmit real-time detection or postretrieval results. In this case, there is an advantage of making it possible for the user to be able to surveil an image captured by a camera which is placed at a remote place.

In addition to the real-time detection processing and the postretrieval processing, in the case in which an image is recorded in the image storage unit 20, the image surveillance/retrieval apparatus can allow the user to select an arbitrary object out of a list of objects which are extracted from the image and are displayed on the display unit, and to specify a time period during which this object was captured to make the image surveillance/retrieval apparatus access corresponding frames stored in the image storage unit 20 and play back the image frames associated with the time period. In the case in which the image surveillance/retrieval apparatus is thus constructed, even if a watcher always does not surveil the live image captured by a camera, and therefore overlooks a certain scene, the watcher can specify a corresponding object provided by this system and make this system play back the scene very easily to watch it.

Figure 11:
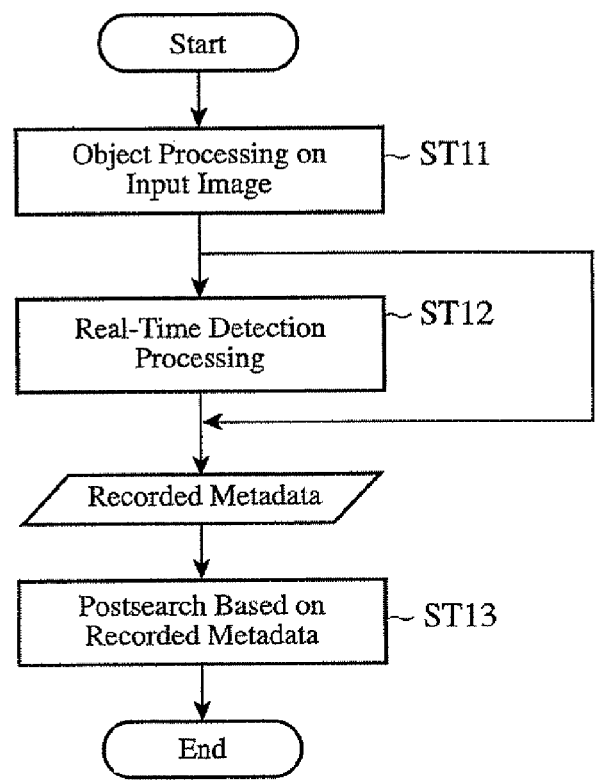
FIG. 11 is a flow chart showing real-time detection processing and postretrieval processing in the image surveillance/retrieval system in accordance with embodiment 1 of the present invention.

Next, the sequence of the operation of the image surveillance/retrieval system will be explained. FIG. 11 is a flow chart showing the real-time detection processing and the postretrieval processing. A relation between the real-time detection processing and the postretrieval processing which are connected to each other via metadata is shown in the figure. The object processing unit 30, in step ST11, performs an object process to the inputted image to extract metadata from the inputted image, and the real-time detection processing unit 60, in step ST12, performs the real-time detection processing on the basis of the extracted metadata and a real-time detection query inputted from the query input unit 50.

When carrying out no real-time detection processing, the object processing unit 30, in step ST11, performs an object process on the inputted image to extract metadata from the inputted image, and stores the extracted metadata in the metadata storage unit 40. The postretrieval processing unit 70, in step ST13, carries out the postretrieval processing on the basis of the metadata stored in the metadata storage unit 40 and a postretrieval query inputted from the query input unit 50.

Figure 12:
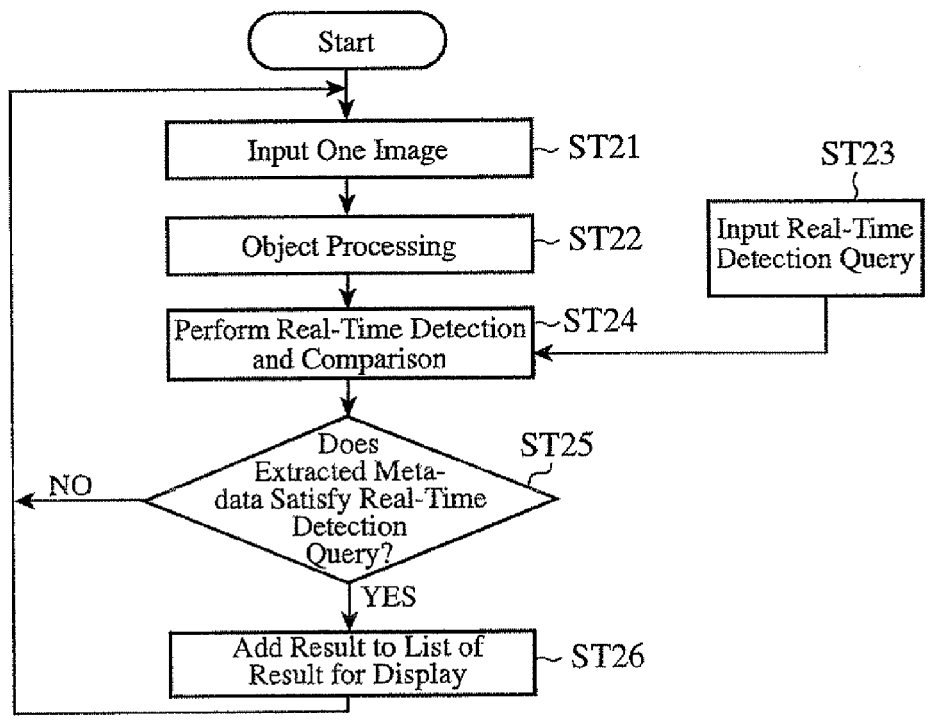
FIG. 12 is a flow chart showing the real-time detection processing in the image surveillance/retrieval system in accordance with embodiment 1 of the present invention.

FIG. 12 is a flow chart showing the real-time detection processing. The object processing unit 30, in step ST21, inputs an image from the image input unit 10, and the object processing unit 30 then, in step ST22, performs an object process on the inputted image to extract metadata from the inputted image. At this time, more specifically, the object processing unit 30 detects each moving object captured in the image, and considers, as an object, a series of appearances of each moving object which can be associated with one another from the continuity in movements to extract, as metadata, information about the traveling path of each moving object and so on.

The query input unit 50 then, in step ST23, inputs a real-time detection query, and the real-time detection processing unit 60, in step ST24, carries out real-time detection and verification on the basis of the extracted metadata and the real-time detection query inputted from the query input unit 50. The real-time detection processing unit 60, in step ST25, verifies whether the extracted metadata matches the real-time detection query. When the real-time detection processing unit 60 verifies that the extracted metadata does not match the real-time detection query, the image surveillance/retrieval system returns to step ST21 in which the object processing unit inputs the next image. When verifying that the extracted metadata matches the real-time detection query, the real-time detection processing unit 60 transmits, as occurrence of an event, real-time detection results to the display unit 80 and the display unit 80 then adds the results to a list of results to be displayed. After that, the image surveillance/retrieval system returns to step ST21 in which the object processing unit inputs the next image.

Figure 13:
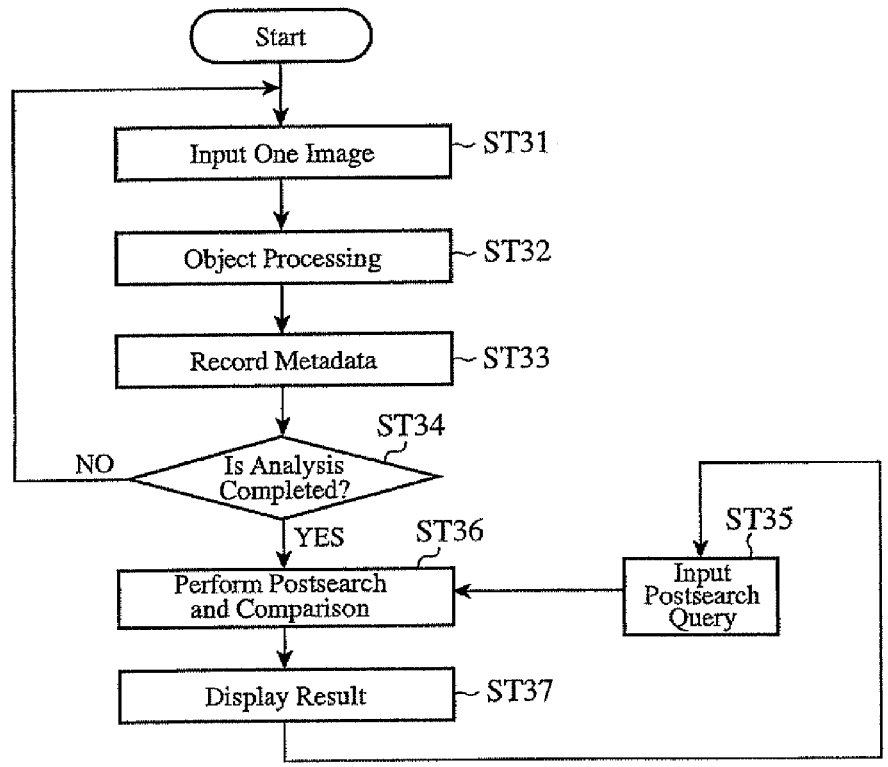
FIG. 13 is a flow chart showing the postretrieval processing in the image surveillance/retrieval system in accordance with embodiment 1 of the present invention.

FIG. 13 is a flow chart showing the postretrieval processing. The processes of steps ST31 and ST32 are the same as those of steps ST21 and ST22 shown in FIG. 12. The object processing unit 30, in step ST33, stores the extracted metadata in the metadata storage unit 40. The object processing unit 30 then, in step ST34, determines whether it has finished performing an analysis on all images which were captured during a time period to be retrieved, and repeats processes of above-mentioned steps ST31 to ST33 until it finishes analyzing all the images which were captured during the time period to be retrieved.

After the object processing unit 30 has finished performing an analysis on all the images which were captured during the time period to be retrieved, the query input unit 50, in step ST35, inputs a postretrieval query, and the postretrieval processing unit 70, in step ST36, does postretrieval collating on the basis of the metadata stored by metadata storage unit 40 and postretrieval query inputted from query input unit 50 to extract an object which satisfies the postretrieval query. The postretrieval processing unit 70 then, in step ST37, transmits a list of extracted objects to the display unit 80, and the display unit 80 carries out a display of the results.

In the case of the postretrieval processing, previous retrieval results can be discarded, and a new retrieval query can be provided and a postretrieval can be carried out again, or a new retrieval query can be additionally provided for previous retrieval results, and then narrowing retrieval can be carried out.

Although not shown in FIGS. 11 to 13, there can be provided, as a method of carrying out the real-time detection processing and the postretrieval processing in combination, a method of performing a postretrieval on results on which the object processing has been performed since a certain past time and in which metadata have been extracted, and continuing the real-time detection processing according to the same query from this time forward. In this case, any object which is outputted through the real-time detection processing can be later added to a list of objects which are once outputted, as postretrieval results, through the postretrieval processing.

As mentioned above, in accordance with this embodiment 1, the watcher can be allowed to automatically acquire object information about all objects each of which has made a movement which matches a specified query without always continuing looking at the live image from the camera. Therefore, the load of performing the surveillance operation on the watcher can be lightened.

Furthermore, in accordance with this embodiment 1, in both the real-time detection processing and the postretrieval processing, the screen is divided into a plurality of block areas, and the traveling path information including the traveling direction and travel time of each extracted object is held as metadata, and whether each extracted object satisfies an input query can be determined only by comparing the metadata with the input query (or verifying whether the metadata matches the input query). Therefore, the processing can be carried out at a very high speed and retrieval results can be obtained in a short time.

In addition, in accordance with this embodiment 1, in the case in which the surveillance operation requires a real-time nature, the real-time detection processing is carried out by setting up a predetermined query specifying a desired movement in advance so that detection of an object which satisfies the predetermined query can be immediately notified to the watcher. Furthermore, in the case in which the corresponding image is recorded independently, even if the watcher has overlooked the image at that time, the image surveillance/retrieval system can play back the image immediately to allow the watcher to check a desired scene.

Furthermore, in accordance with this embodiment 1, in the case in which the surveillance operation does not require a real-time nature so much, the image surveillance/retrieval system can retrieve objects which have made a desired movement during a certain time period through the postretrieval processing collectively, and can playback corresponding images captured during the time period individually to allow the watcher to check desired scenes. Therefore, surveillance results can be summarized collectively.

In addition, in accordance with this embodiment 1, the real-time detection processing and the postretrieval processing can be carried out in combination. For example, in the case in which a scene in which an object which has made a doubtful movement which cannot be expected appears is found out through the real-time detection processing, the image surveillance/retrieval system can find out an object which has been overlooked through the real-time detection processing by changing the query which is set up at the time of the real-time detection, and then carrying out a postretrieval.

In addition, in accordance with this embodiment 1, when carrying out the postretrieval processing, the image surveillance/retrieval system can carry out retrieval repeatedly by resetting up a retrieval query again and again, and can also add a new retrieval query one after another to carry out narrowing retrieval. Therefore, the image surveillance/retrieval system can allow the watcher to evaluate surveil images from all angles.

In addition, in accordance with this embodiment 1, because the size of metadata provided for each object is fixed, the metadata can be easily stored in the image surveillance/retrieval system.

Embodiment 2

Figure 14:
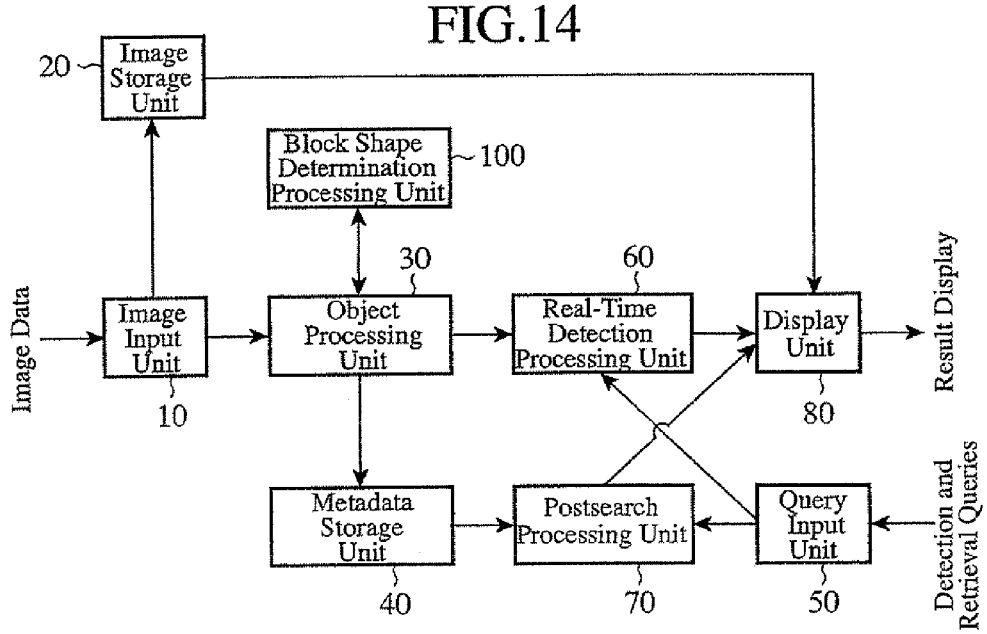
FIG. 14 is a block diagram showing the structure of an image surveillance/retrieval system in accordance with embodiment 2 of the present invention.

FIG. 14 is a block diagram showing the structure of an image surveillance/retrieval system in accordance with embodiment 2 of the present invention. This image surveillance/retrieval system is provided with an image input unit 10, an image storage unit 20, an object processing unit 30, a metadata storage unit 40, a query input unit 50, a real-time detection processing unit 60, a postretrieval processing unit 70, a display unit 80, and a block shape determination processing unit 100. In the image surveillance/retrieval system of this embodiment, the block shape determination processing unit 100 is added to the structure, as shown in FIG. 1, of that in accordance with above-mentioned embodiment 1, and therefore the other structure of the image surveillance/retrieval system of this embodiment is the same as the structure shown in FIG. 1.

In above-mentioned embodiment 1, the image screen is divided into a total of m×n equal-sized rectangular block areas in which m rectangular block areas are running in a direction of its width (i.e., a direction of an X-axis), and n rectangular block areas are running in a direction of its height (i.e., a direction of a Y-axis) so that metadata about the traveling direction, the traveled distance, and the travel time of each object is held for each of the plurality of block areas. The values of m and n can be determined according to both the distance between an object to be shot and a camera, the camera's angle of view, the size and speed of the object to be shot, or a desired degree of accuracy of retrieval, and a memory size required to hold the metadata, etc. The image surveillance/retrieval system in accordance with this embodiment 2 has a function of varying these values m and n, i.e. the size of each of the plurality of equal-sized block areas.

In FIG. 14, the block shape determination processing unit 100 sets the size of each of the plurality of equal-sized block areas into which the image screen is divided by the object processing unit 30 according to an instruction from the user, and notifies the object processing unit 30 of the size of each of the plurality of equal-sized block areas which are used as units for holding the metadata about traveling path information extracted from an inputted image. The operation of each other component shown in FIG. 14 is the same as that of above-mentioned embodiment 1.

For example, in the case in which the camera and an object to be shot are far apart from each other, or in the case in which the camera has a lens having a wide angle of view, it can be considered that the size of a target object with respect to the size of an image obtained by the camera, and the amount of movement and speed of the target object are relatively small. In such a case, in order to improve the resolution for retrieval, it is preferable that the size of each of the plurality of equal-sized block areas is set to a smaller one. In contrast, in the case in which the camera and the object to be shot are close to each other, or in the case in which the camera has a lens having a narrow angle of view, the size of a target object with respect to the size of an image obtained by the camera, and the amount of movement and speed of the target object can be relatively large. In such a case, a finer resolution for retrieval is not needed conversely, and what is necessary is just to set the size of each of the plurality of equal-sized block areas to a larger one. The user can determine the size of each of the plurality of equal-sized block areas after watching the inputted image from the camera. When the size of each of the plurality of equal-sized block areas is determined by the user, the block shape determination processing unit 100 receives the determination result from the user and notifies it to the object processing unit 30.

As mentioned above, while this embodiment 2 offers the same advantage as provided by above-mentioned embodiment 1, in the case in which a higher degree of accuracy of retrieval is not needed, this embodiment 2 offers another advantage of being able to reduce the needed amount of storage used for holding the metadata by enlarging the size of each of the plurality of equal-sized block areas, and being able to lighten the processing required for analysis or retrieval without having to improve the retrieval accuracy uselessly. This embodiment 2 offers a further advantage of being able to improve the accuracy of retrieval by setting the size of each of the plurality of equal-sized block areas to a smaller one in the case in which a target object is relatively small and makes minute movements.

In the above-mentioned example, the block shape determination processing unit 100 notifies the object processing unit 30 of the size of each of the plurality of equal-sized block areas for which the metadata about traveling path information extracted from the inputted image is held according to an instruction from the user. As an alternative, a method of automatically adjusting the size of each of the plurality of equal-sized block areas can be provided.

For example, while the object processing unit 30 accepts the image inputted from the image input unit 10 and then performs an object process on it, the object processing unit measures an average size and an average movement of each object. When determining that the average size and average movement of each object which are measured by the object processing unit 30 are small, the block shape determination processing unit 100 sets the size of each of the plurality of equal-sized block areas to a small one. In contrast, when determining that the average size and average movement of each object which are measured by the object processing unit 30 are large, the block shape determination processing unit 100 sets the size of each of the plurality of equal-sized block areas to a large one and then notifies it to the object processing unit 30. Such automatic adjustment processing can be put in practical use after the processing is carried out on a trial basis at the time when the system is installed for adjustment before the actual surveillance operation is started. In the case in which the status changes in a long span of time while the automatic correction processing is put in practical use, the size of each of the plurality of equal-sized block areas can be adjusted dynamically.

In addition, since the image surveillance/retrieval system in accordance with this embodiment 2 has a function of automatically adjusting the size of each of the plurality of equal-sized block areas, another advantage of being able to set up this adjustment without the user's time and effort, as well as an advantage of being able to adjust the above-mentioned amount of needed storage, and the accuracy of analysis and retrieval processing properly, are provided.

Embodiment 3

A block diagram showing the structure of an image surveillance/retrieval system in accordance with embodiment 3 of the present invention is the same as that shown in FIG. 14 of above-mentioned embodiment 2. The image surveillance/retrieval system in accordance with this embodiment 3 adjusts the size of each of the plurality of block areas according to the on-screen position of each object without putting restrictions that make all the block areas on the screen have the same size.

Figure 15:
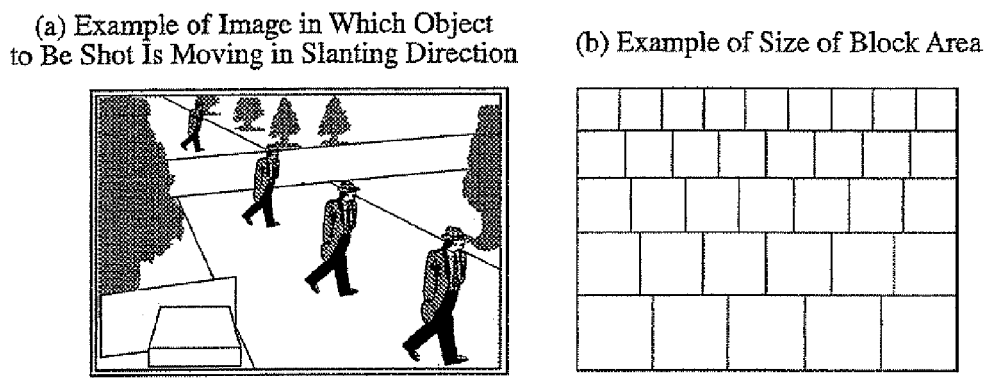
FIGS. 15(a) and 15(b) are diagrams showing an example of an image in which the size of each block area is adjusted according the on-screen position of an object in an image surveillance/retrieval system in accordance with embodiment 3 of the present invention.

FIGS. 15(*a*) and 15(*b*) are diagrams showing an example of an image in which the size of each of the plurality of block areas is adjusted according the on-screen position of an object to be shot. As shown in the example of the image of FIG. 15(*a*) in which the object to be shot is moving in a slanting direction, when using a surveillance camera, there are actually many cases in which the optical axis of the camera forms a shallow angle with the ground surface included in the image of the object to be shot, and the camera simultaneously captures a wide area extending from a place in the front thereof to a distant place. In this case, as previously explained in above-mentioned embodiment 2, the average size of the object and the amount of movement of the object differ dependently upon whether the object is located in an upper portion of the screen or in a lower portion of the screen. In order to handle such a case, as shown in the example of the size of each block area of FIG. 15(*b*), a method of determining the ratio among the on-screen sizes of the object which appears in block areas, and adjusting the size of each block area which is dependent upon the position of each block size according to the ratio can be used.

Hereafter, a method of making a correction to the traveled distance of each object will be explained. In this case, the size of each block area is adjusted according to the approximate on-screen size of an object to be shot which was captured at a corresponding position in the real world. Therefore, when holding the information about the traveled distance of an object as metadata, it is necessary to make a correction to the information about the traveled distance according to the difference in the sizes of the plurality of block areas. That is, for the traveled distance information in above-mentioned embodiment 1, and speed information associated with it, an example of making a comparison by simply using a number of pixels on the screen is provided above. In contrast, a number which is obtained by correcting this pixel number according to the ratio among the on-screen sizes of an object which appears in block areas is evaluated and stored. For example, when one side of the largest block area has a length which is twice the length of one side of the smallest block area, a movement by 10 pixels of an object in the smallest block area corresponds to a movement by 20 pixels in the largest block area. That is, in order to convert the traveled distance in the smallest block area to an equivalent traveled distance in the largest block area, it is necessary to double the traveled distance in the smallest block area.

As a result, even when an evaluation of the average speed of each object is performed, a correction is similarly made to the average speed of each object. For example, in the case in which an object captured at a distance from the camera is moving at the same speed as another object captured in a neighborhood of the camera, although it is evaluated first that the average on-screen speed of the former object is smaller than that of the latter object, the average on-screen speeds of these objects are corrected to the same value. Similarly, in the case in which the size of each object, as well as the above-mentioned pieces of information, are used as metadata, a correction can be also made to the size information. Therefore, such a problem that it is evaluated that an object captured at a distance from the camera has a smaller size on the screen than that of another object captured in a neighborhood of the camera which has the same size as the former object in the real world can be solved.

As the method of setting the size of each of the plurality of block areas, there can be a method of allowing the user to perform an input operation on the block shape determination processing unit 100 manually, as explained in above-mentioned embodiment 2, so as to set the size of each of the plurality of block areas to a smaller one with distance from the lower end of the screen toward an upward direction in such a case as shown in FIG. 15(b) in which an object captured at a farther distance from the camera appears in a further upper block area on the screen. As an alternative, the block shape determination processing unit 100 can receive the results of measurements of the average sizes of objects extracted from a distant place and a neighboring place captured by the camera, respectively, from the object processing unit 30, can acquire the ratio between the measured average sizes of the objects, and can calculate a ratio among the respective sizes of the plurality of block areas so as to automatically adjust the size of each of the plurality of block areas.

As mentioned above, in accordance with this embodiment 3, the same advantage as provided by above-mentioned embodiment 2 is offered. Furthermore, the present embodiment offers another advantage of being able to reduce variations in the degree of accuracy of retrieval by absorbing the difference in size, speed, traveled distance, etc. among objects, which results from the positional relation between the camera and each part of the object to be shot which differs according to the position of each part of the object to be shot on the screen by adjusting the size of each of the plurality of block areas according to the position of each of the plurality of block areas on the screen.

Embodiment 4

Figure 16:
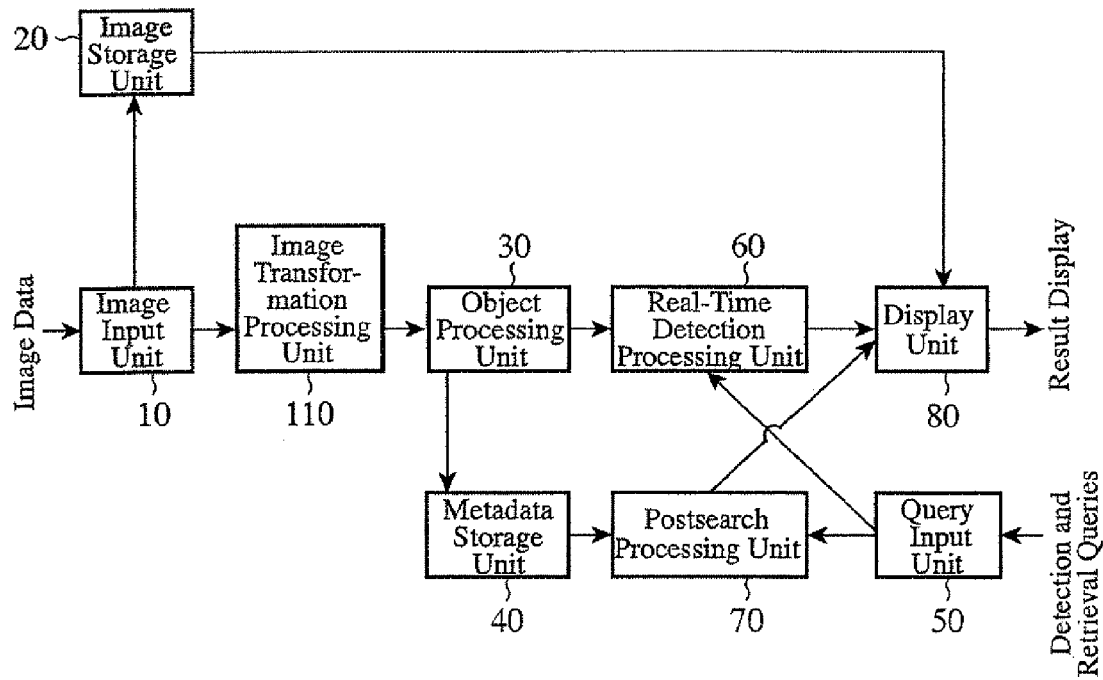
FIG. 16 is a block diagram showing the structure of an image surveillance/retrieval system in accordance with embodiment 4 of the present invention.

FIG. 16 is a block diagram showing the structure of an image surveillance/retrieval system in accordance with embodiment 4 of the present invention. This image surveillance/retrieval system is provided with an image input unit 10, image storage unit 20, an object processing unit 30, a metadata storage unit 40, a query input unit 50, a real-time detection processing unit 60, a postretrieval processing unit 70, a display unit 80, and an image transformation processing unit 110. In the image surveillance/retrieval system of this embodiment, the image transformation processing unit 110 is added to the structure, as shown in FIG. 1, of that in accordance with above-mentioned embodiment 1, and therefore the other structure of the image surveillance/retrieval system of this embodiment is the same as the structure shown in FIG. 1.

In accordance with any of above-mentioned embodiments 1 to 3, an image inputted from a camera is fundamentally transmitted to the object processing unit 30 juts as it is, and is then forwarded to subsequent processing. In contrast, the image surveillance/retrieval system in accordance with embodiment 4 carries out object processing after making a position correction to the inputted image by performing an image transformation on the inputted image so that the object processing can be performed on the inputted image in such a manner that a retrieval query is easily set up later.

Furthermore, because it may be evaluated that an object captured at a distance from the camera has a size, an amount of movement, and a speed on the screen which are different from those of another object captured in a neighborhood of the camera which has the same size, the amount of movement, and the speed as the former object in the real world, the image surveillance/retrieval system in accordance with above-mentioned embodiment 3 adjusts the size of each of the plurality of block areas which are units from which metadata is extracted and for which the metadata is stored to generate metadata in which variations due to the difference in distance from the camera are corrected. In contrast, in order to produce the same effect, the image surveillance/retrieval system in accordance with this embodiment 4 performs a projective transformation on the image data on which the object processing is to be performed so that variations due to the difference in distance from the camera can be removed from the metadata even in the case that the sizes of the plurality of block areas are all set to the same one.

In FIG. 16, the image transformation processing unit 110 performs a projective transformation on the image data inputted by the image input unit 10 so that image data associated with a specified screen area is transformed to image data associated with a rectangular screen area, and transmits the transformed image data associated with this rectangular screen area to the object processing unit 30. This image transformation processing unit 110 can have, as an input/output function of accepting an transformation processing instruction from the user, a GUI (Graphical User Interface) function of making it possible for the user to specify a screen area, which is the target for the projective transformation and which will be mentioned below, by using a mouse or the like in a state in which the image is displayed on the monitor.

Figure 17:
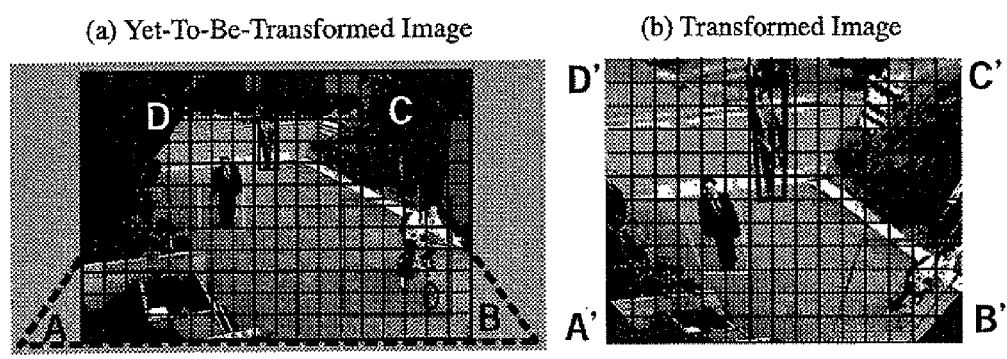
FIGS. 17(a) and 17(b) are diagrams showing an example of transform processing for projecting positions on a screen onto a specific rectangular area to correct the positions in the image surveillance/retrieval system in accordance with embodiment 4 of the present invention.

FIGS. 17(a) and 17(b) are diagrams showing an example of the transformation processing for projecting positions on the screen onto a specific rectangular screen area to make a correction to the on-screen positions. For a yet-to-be-transformed image as shown in FIG. 17(a), when determining that the ground surface in the object to be shot is horizontal from the positional relation among objects captured into the image, the image transformation processing unit 110 makes the user specify on-screen four points A, B, C, and D forming a bilaterally-symmetrical trapezoid. In this case, only four points forming a rectangle which can be drawn on the ground surface in the real world which is seen in the object to be shot which is captured into the image can be specified as the four points. The image transformation processing unit 110 performs a projective transformation on the inputted image so that image data associated with the trapezoidal screen area defined by the four points is transformed into image data associated with the rectangular screen area to produce a transformed image as shown in FIG. 17(b).

In this example, the trapezoidal screen area ABCD is projected onto the rectangular screen area A'B'C'D' so that only image information within the trapezoidal screen area ABCD remains in the transformed image. As an alternative, the image transformation processing unit 110 can perform a projective transformation on the whole of the image including image information about outside the trapezoidal screen area. Furthermore, in the example of FIG. 17(a) in which the points A and B are located outside the image, the image transformation processing unit 110 offers a GUI which makes it possible for the user to specify points which are located outside the image from the camera to enable the user to choose such the points. As an alternative, the image transformation processing unit 110 makes it possible for the user to choose four points which are located within the image from the camera, and can perform an projective transformation on the image so that image information about outside the trapezoidal screen area defined by the four points can be included in the transformed image if needed.

As mentioned above, in accordance with this embodiment 4, the same advantages as offered by above-mentioned embodiment 1 can be provided. Furthermore, the image surveillance/retrieval system in accordance with above-mentioned embodiment 3 performs the object processing on the transformed image to extract metadata from the transformed image so that an object captured at a distance from the camera can have the same ratio between its size, its amount of movement, and its speed on the screen to the size of each block area as those of another object captured in a neighborhood of the camera which has the same size, the amount of movement, and the speed as the former object in the real world.

In addition, this embodiment 4 also offers an advantage of being able to solve the problem that a positional query in finer steps can be set up for an object captured in a neighborhood of the camera while such a positional query in finer steps cannot be set up for an object captured at a distance from the camera, that is, the resolution for the retrieval processing differs dependently upon the on-screen position because an object captured at a distance from the camera has a ratio of its on-screen size to the size of each block area for holding metadata which is different from that of another object captured in a neighborhood of the camera which has the same size as the former object in the real world.

Embodiment 5

A block diagram showing the structure of an image surveillance/retrieval system in accordance with embodiment 5 of the present invention is the same as that shown in FIG. 16 of above-mentioned embodiment 4. In the correction processing through a projective transformation of a camera image shown in above-mentioned embodiment 4, variations due to the difference in distance from the camera in the metadata can be corrected. In accordance with this embodiment 5, the image transformation processing unit 110 adjusts an angle of the direction of the optical axis extending from the camera with respect to the physical arrangement of an object to be shot captured into the camera image so that a correction can be made to the direction of the camera with respect to the object to be shot. That is, the image transformation processing unit 110 adjusts the angle which the object to be shot in the screen area forms with the direction of the optical axis extending from the camera which is capturing the object to be shot, and performs a projective transformation on image information associated with a rectangular part of the object to be shot to produce image information associated with an on-screen rectangular area.

Figure 18:
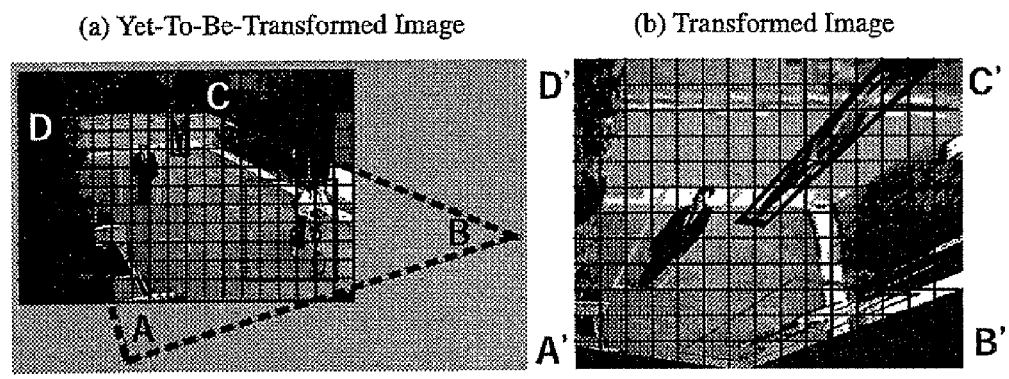
FIGS. 18(a) and 18(b) are diagrams showing an example of transform processing for projecting positions on a screen onto a specific rectangular area to correct the positions in an image surveillance/retrieval system in accordance with embodiment 5 of the present invention.

FIGS. 18(*a*) and 18(*b*) are diagrams showing an example of transformation processing for projecting positions on the screen onto a rectangular area to make a correction to the positions. FIG. 18(*a*) shows an example of a yet-to-be-transformed image, like FIG. 17(*a*). In this image, a road which is running along a lateral direction and at a distant place from the camera in the real world is seen on the screen with its direction being a horizontal direction. Therefore, it is sensuously clear that it is easy to retrieve a captured moving object from the image, such as a person who is moving rightward or leftward along the road. In contrast, because another road which is running from a front side of the object to be shot toward a far side of the object to be shot in the real world is seen on the screen with its direction being a slanting direction, a query set for detecting a moving object which is moving in a rightward-and-downward or leftward-and-upward slanting direction on the screen may be set up for the retrieval of a moving object like a person who is moving toward the front side or far side of the object to be shot.

Like the image surveillance/retrieval system in accordance with above-mentioned embodiment 4, when making the user choose four points A, B, C, and D on the screen of FIG. 18(*a*), the image transformation processing unit 110 allows the user to select, as the four points, only four points forming a rectangle which can be drawn on the ground surface in the real world which is seen in the object to be shot which is captured into the image. In this case, the user does not need to specify four points forming a bilaterally-symmetrical trapezoid on the screen. For example, the user is allowed to select four points forming a rectangle which is extending along a direction parallel to the direction of a building, a road, or the like captured into the image. In the example of FIG. 18(*a*), four points A, B, C, and D forming a rectangle which is extending along a direction parallel to the direction of the road which is running from the front side of the object to be shot toward the far side of the object to be shot in the real world are selected. FIG. 18(*b*) shows an image associated with a rectangular area A'B'C'D' which is produced by performing a projective transformation on image information associated with a quadrangle ABCD.

As a result, as shown in FIG. 18(*b*), the road which is running along the lateral direction at a distant place from the camera in the real world is seen in the image with its direction being a horizontal direction on the screen, while the other road which is running from the front side of the object to be shot toward the far side of the object to be shot in the real world is seen in the image with its direction being a vertical direction on the screen. That is, an object which is moving along the other road from the far side toward the front side in the real world is seen in the transformed image as if it is moving in a downward direction. When an object walks from the front side toward the far side and then makes a right turn at the intersection in the real world, the yet-to-be-transformed camera image shows that the object moves from a lower right-hand side thereof to an upper left-hand side thereof, changes its traveling direction with an acute angle at the intersection, and then moves rightward. In contrast, the transformed image shows that the object moves in an upward direction, changes its traveling direction with a right angle at the intersection, and then moves rightward.

When playing back an original image on the basis of retrieval results which are obtained from such a transformed image, the image surveillance/retrieval system only has to play back the corresponding natural image which is yet-to-be image-transformed and which is currently recorded in the image storage unit 20. The image surveillance/retrieval system can also record the transformed image in the image storage unit to use it later.

As mentioned above, in accordance with this embodiment 5, the same advantages as offered by above-mentioned embodiment 4 can be provided. Furthermore, since the image surveillance/retrieval system in accordance with this embodiment carries out a projective transformation in such a manner as to adjust the angle which an object to be shot forms with the direction of the optical axis extending from the camera, and then carries out object processing on the transformed image to extract metadata from the image. Therefore, the image surveillance/retrieval system can easily set up, as a retrieval query, a specific traveling direction or a specific change in the traveling direction, like a right turn or a left turn, according to the conditions of the natural scene which is the object to be shot.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image surveillance/retrieval system comprising:
an image input unit for receiving image data;
an object processing unit for dividing each image frame of the image data into a plurality of block areas, for detecting each individual object from each image frame, for extracting, as one object, a series of appearances of each identical object in a plurality of image frames, and for extracting features of the object extracted as metadata for each of the plurality of block areas;
a metadata storage unit for storing the metadata obtained by said object processing for each of the plurality of block areas;
a query input unit for receiving a real-time detection query or a post-retrieval query;
a real-time detection processing unit for comparing the metadata for each of the plurality of block areas with the real-time detection query received by said query input unit, and for detecting an object which satisfies the real-time detection query;
a post-retrieval processing unit for comparing the metadata for each of the plurality of block areas which is stored in said metadata storage unit with the post-retrieval query received by said query input unit, and for retrieving an object which satisfies the post-retrieval query; and
a display unit for displaying either the object detected by said real-time detection processing unit or the object retrieved by said post-retrieval processing unit.

2. The image surveillance/retrieval system according to claim 1, wherein said object processing unit extracts, as the metadata for each of the plurality of block areas, one of a traveling direction in which the object has traveled, a distance traveled by the object, and a travel time required for the object to travel in each of the plurality of block areas.

3. The image surveillance/retrieval system according to claim 1, including a block shape determination processing unit for setting a size of each of the plurality of block areas into which each image frame of the image data is divided by said object processing unit.

4. The image surveillance/retrieval system according to claim 1, including a block shape determination processing unit for setting a size of each of the plurality of block areas into which each image frame of said image data is divided by said object processing unit based on average size or average movement of the object as measured by said object processing unit.

5. The image surveillance/retrieval system according to claim 1, including a block shape determination processing unit for adjusting size of each of the plurality of block areas into which each image frame of the image data is divided by said object processing unit based on size or movement of the object as measured by said object processing unit.

6. The image surveillance/retrieval system according to claim 1, including an image transformation processing unit for projective transformation of a specified screen area in the image data input by said image input unit into a rectangular area, and transmitting this rectangular area to said object processing unit.

7. The image surveillance/retrieval system according to claim 1, including an image transformation processing unit for adjusting an angle between an object to be shot in a screen area and direction of an optical axis extending from a camera which is shooting the object for projective transformation of the screen area into a rectangular area.

* * * * *